United States Patent
Aurora et al.

(10) Patent No.: US 12,080,875 B2
(45) Date of Patent: Sep. 3, 2024

(54) PROCESSES TO FABRICATE POROUS SILICON AND ITS USE AS FEEDSTOCK FOR SECONDARY BATTERY ELECTRODES

(71) Applicant: Navitas Systems, LLC, Lisle, IL (US)

(72) Inventors: Peter Aurora, Ann Arbor, MI (US); Pu Zhang, Ann Arbor, MI (US); Michael Wixom, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 851 days.

(21) Appl. No.: 17/154,483

(22) Filed: Jan. 21, 2021

(65) Prior Publication Data

US 2021/0167360 A1    Jun. 3, 2021

Related U.S. Application Data

(63) Continuation of application No. 15/741,903, filed as application No. PCT/US2016/041619 on Jul. 8, 2016, now abandoned.
(Continued)

(51) Int. Cl.
*H01M 4/134* (2010.01)
*C01B 33/023* (2006.01)
(Continued)

(52) U.S. Cl.
CPC ........... *H01M 4/134* (2013.01); *C01B 33/023* (2013.01); *C01B 33/037* (2013.01);
(Continued)

(58) Field of Classification Search
CPC .. H01M 4/134; H01M 4/0404; H01M 4/0471; H01M 4/0492; H01M 4/1395; H01M 4/364; H01M 4/386; H01M 10/052
See application file for complete search history.

(56) References Cited

U.S. PATENT DOCUMENTS

| | | |
|---|---|---|
| 6,187,446 B1 | 2/2001 | Laurell et al. |
| 6,875,374 B1 | 4/2005 | Zhan et al. |
| 7,157,177 B2 | 1/2007 | Chan |
| 8,039,152 B2 | 10/2011 | Richard et al. |
| 8,679,679 B2 | 3/2014 | Zhang et al. |
| 2011/0085960 A1 | 4/2011 | Mukasyan et al. |

(Continued)

FOREIGN PATENT DOCUMENTS

| | | |
|---|---|---|
| WO | 2013/147958 A2 | 10/2013 |
| WO | 2013/179068 A2 | 12/2013 |

OTHER PUBLICATIONS

European Supplementary Search Report and Opinion 16822066.3 dated Apr. 8, 2019.
(Continued)

*Primary Examiner* — Jane J Rhee
(74) *Attorney, Agent, or Firm* — Weston R. Gould; Dinsmore & Shohl LLP

(57) ABSTRACT

Provided are processes to form microporous silicon useful as an active material in an electrode of an electrochemical cell the processes including subjecting a mixture of silicon oxide and a metal reducing agent, optionally aluminum, to mechanical milling to form mechanically activated silicon oxide/aluminum, thermally treating the silicon oxide/aluminum to reduce the silicon oxide and form $Si/Al_2O_3$, and removing at least a portion of the alumina from the Si to form a microporous silicon. The resulting electrochemically active microporous silicon is also provided with residual alumina present at 15% by weight or less that demonstrates excellent cycle life and safety.

11 Claims, 9 Drawing Sheets

Related U.S. Application Data

(60) Provisional application No. 62/189,826, filed on Jul. 8, 2015.

(51) Int. Cl.
    *C01B 33/037*     (2006.01)
    *H01M 4/04*     (2006.01)
    *H01M 4/1395*     (2010.01)
    *H01M 4/36*     (2006.01)
    *H01M 4/38*     (2006.01)
    *H01M 10/052*     (2010.01)

(52) U.S. Cl.
    CPC ....... *H01M 4/0404* (2013.01); *H01M 4/0471* (2013.01); *H01M 4/0492* (2013.01); *H01M 4/1395* (2013.01); *H01M 4/364* (2013.01); *H01M 4/386* (2013.01); *C01P 2006/16* (2013.01); *H01M 10/052* (2013.01)

(56) References Cited

U.S. PATENT DOCUMENTS

2013/0189575 A1     7/2013     Anguchamy et al.
2014/0377653 A1     12/2014     Park et al.

OTHER PUBLICATIONS

Wei Wang et al: "Monodisperse Porous Si l i con Spheres as Anode Materi al s for Li thi um Ion Batteries", Scientific Reports, vol. 5, No. 1, Mar. 5, 2015 ( Mar. 5, 2015), XP055546654, DOI: 10.1038 / srep08781 * p. 2, figure 1 * * p. 5, "Methods"*.

Sinho Choi et al : "Revisit of metallothermic reduction for macroporour Si: compromise between capacity and volume expansion for practical Li-ion battery", Nano Energy, vol. 12, Mar. 1, 2015 (Mar. 1, 2015), pp. 161-168, XP055546398, I SSN: 2211-2855, DOI: 10.1016/ j. nanoen. 2014.12.010 *p. 162, "Synthesis of micro-/nanoporous Si particles" * p. 167, "Conclusions"*.

International Search Report from corresponding PCT/US2016/041819, mailed Sep. 30, 2016.

PROCESSES TO FABRICATE POROUS SILICON AND ITS USE AS FEEDSTOCK FOR SECONDARY BATTERY ELECTRODES

CROSS REFERENCE TO RELATED APPLICATIONS

This application is a continuation of U.S. patent application Ser. No. 15/741,903 filed Jan. 4, 2018, which is a U.S. National Phase under 35 U.S.C. § 371 of PCT/US2016/041619 filed Jul. 8, 2016, and which depends from and claims priority to U.S. Provisional Application No. 62/189,826 filed Jul. 8, 2015, the entire contents of each of which are incorporated herein by reference.

FIELD

The invention relates generally to methods of producing anode active materials. More specifically, methods are provided for the production of microporous silicon that can be used as an anode active material in secondary batteries.

BACKGROUND

Microporous silicon has been widely produced in the semiconducting industry for over 50 years. Electrochemical etching has been the most investigated approach for the formation of microporous silicon for chip-based applications and has been used to create highly directional mesoporosity and macroporosity. A number of techniques such as anodization, vapor etching, glancing angle deposition, lithographic etching, and photoetching are also suitable for Si wafer-based processing. Other methods have been used with both wafer and powder silicon feedstock, such as stain etching, galvanic etching, and metal nanoparticle-assisted etching.

There is an increasing need and interest in microporous silicon (μpSi) fabrication routes that utilize existing feedstock or silicon-based molecules that are themselves byproducts from silicon production. Such processes typically use chemical conversion of, for example, silica, silane, or silicon tetrachloride [Bao Z, Weatherspoon M R, Shian S, Cai Y, Graham P D, Allan S M, Ahmad G, Dickerson M B, Church B C, Kang Z, Abernathy H W III, Summers C J, Liu M, Sandhage K H (2007), Nat Lett 446:172]. This chemical conversion can be promoted thermally, mechanically, or electrochemically. In these approaches the porosity and particle morphology can be directed either by the starting solid feedstock or by how the silicon nanoparticles assemble into a porous body via a subsequent densification step.

Direct production of highly porous silicon by chemical conversion of silica is receiving recent attention for applications that require relatively inexpensive material. For example silica has been reduced to silicon at moderate temperatures using magnesium vapor (magnesiothermic reduction) as a reducing agent with a range of different silica feedstock, including diatoms, sand, opal, zeolite, aerogels, SBA-15, bamboo extract, template silica, rice husk ask, and silicon monoxide [Fukatani K, Ishida Y, Aiba T, Miyata H, Den T (2005), Appl Phys Lett 87:253112, Krishnamurthy A, Rasmussen D H, Suni II (2011), J Electrochem Soc 158(2): D68-D71]

The two most studied ways to produce μpSi powder are metal assisted etching of Si and magnesiothermic reduction of $SiO_2$. A great disadvantage to the etching approaches is the usage of the highly dangerous HF solution to create the pores on the silicon surfaces. Producing highly porous structures at high volumes via etching techniques typically generates large quantities of unreacted or under-reacted solid silicon substrate as a waste product unless it is recycled. In the case of the magnesiothermic reduction the major challenge is that the highly exothermic reaction would make it difficult to avoid sintering and collapse of the desired pore structure, particularly as the reaction is scaled up. A second challenge regards applications where porous silicon is required with minimum oxide content. Residual oxides may increase irreversible loss or initial capacity loss (ICL) of lithium in the battery. The aqueous HCl at elevated temperatures used to remove the MgO by-product has often reintroduced significant amounts of silica (oxide) in highly porous silicon. The use of aqueous HF as a final processing step to remove such a phase increases the EHS burden of the magnesiothermic reduction process, especially when biogenic silicas are utilized [Batchelor L, Loni A, Canham L T, Hasan M, Coffer J L (2012), Silicon 4:259-266]

As such, new methods of producing microporous silicon are needed.

SUMMARY OF THE INVENTION

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is a first object to provide a process of forming an electrochemically active silicon material using materials and processes with lower environmental impact than prior methods. The processes provided do not require harsh acids such as hydrogen fluoride as etchants and are capable of activation at relatively lower temperatures, e.g. less than 700° C. A process includes subjecting a combination of powdered silicon oxide and aluminum to mechanical milling to form a mechanically activated silicon oxide/aluminum composite; thermally treating said composite by exposure to heat at a temperature of 500 degrees Celsius to 700 degrees Celsius under an inert or reducing atmosphere to form $Si/Al_2O_3$; and removing at least a portion of alumina from said $Si/Al_2O_3$ by exposing said $Si/Al_2O_3$ to an etchant to form microporous silicon. The precursor silicon oxide is optionally of an average linear dimension (e.g. diameter) of 500 μm or less. An advantage of the provided processes is their ability to reduce the silicon oxide at relatively lower temperatures. The heat used in a process it optionally 500 degrees Celsius to 600 degrees Celsius. In the mechanical mixing the ball to powder mass ratio is optionally 8:1 or greater. Other characteristics of the claimed processes are the ability to exclude the use of etchants that include fluorine. As such, an etchant optionally excludes fluorine, optionally excludes hydrogen fluoride. An etchant as used in the processes optionally is or includes HCl, $H_2SO_4$, $H_3PO_4$, $HNO_3$ or combinations thereof. In the processes, the weight percent of alumina removed is optionally 85 weight percent to 100 weight percent, optionally 85 weight percent to 99 weight percent. The subjecting step optionally includes high energy ball milling. A milling time is optionally greater than 0.5 hours, optionally 0.5 to 24 hours. A step of thermally treating is optionally for a thermal treatment time of 10 minutes to 12 hours.

It is another object to provide a process of forming an electrode suitable for use in an electrochemical cell. A process includes: providing an anode active material comprising microporous silicon optionally produced as described herein by a two-step reduction process; combining said microporous silicon with a binder to form a slurry; and coating said slurry on an electrically conductive substrate to form an electrode. In some aspects, the active material further includes graphite. Optionally the step of providing includes subjecting a combination of powdered silicon oxide and a metal reducing agent, optionally aluminum, to mechanical milling to form a mechanically activated silicon oxide/aluminum composite, optionally $SiO_2/Al$, powder; thermally treating said silicon oxide/aluminum powder by exposure to heat at a temperature of 500 degrees Celsius to 700 degrees Celsius under an inert or reducing atmosphere to form $Si/Al_2O_3$; removing at least a portion of alumina from said $Si/Al_2O_3$ by exposing said $Si/Al_2O_3$ to an etchant to form microporous silicon. In some aspects, the microporous silicon includes residual alumina at an alumina weight percent of 0.1 to 15.

It is another object to provide an electrochemically active material that includes microporous silicon, optionally produced by a process as provided herein. An electrochemically active material includes: a microporous silicon and alumina, said alumina present at 15% or less by weight of said material and where the microporous silicon and the alumina are intermixed and mechanically activated. The alumina is optionally present at 15% by weight or less, optionally 5% by weight or less, optionally 1% by weight or less. The electrochemically active material optionally further includes carbon. In some aspects, an electrochemically active material is characterized by a cycle life of 80 percent capacity or greater at cycle 40, optionally a cycle life of 80 percent capacity or greater at cycle 80. In some aspects, an electrochemically active material has an initial capacity loss of less than 20%. The alumina in an electrochemically active material optionally includes alpha-alumina, optionally includes gamma-alumina, or both. In some aspects, an electrochemically active material optionally excludes alpha-alumina. In some aspects, an electrochemically active material optionally excludes gamma-alumina. In some aspects, an electrochemically active material optionally excludes alpha-alumina and gamma-alumina.

DETAILED DESCRIPTION

Figure 1:
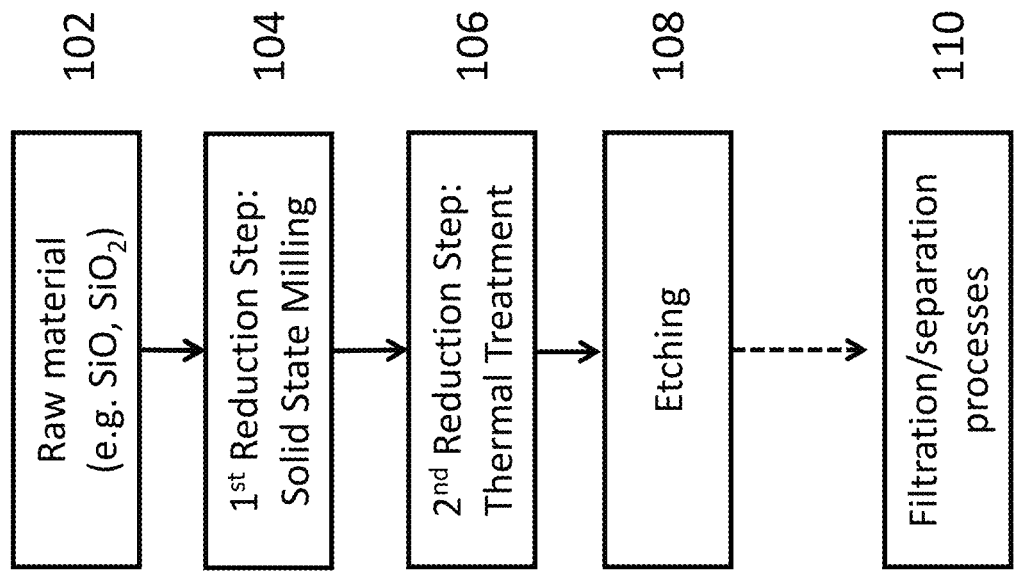
FIG. 1 is a schematic of an exemplary process.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "microporous" with respect to microporous silicon is defined as having an average particle size of 0.1 to 50 micrometers (μm) and an average pore diameter of 20 to 500 nanometers (nm). Microporous silicon may have a raspberry-like overall structure.

As used herein, the term "high energy" is defined as milling with energy at or above that produced by a Retsch PM 400 planetary mill with a rational speed of equal to or greater than 250 revolutions per minute (rpm) with a ball to powder ratio of equal to or greater than 10:1.

As used herein, the term "low energy" is defined as milling with energy at or below that produced by a Retsch PM 400 planetary mill with a rational speed of equal to or lower than 200 revolutions per minute (rpm) with a ball to powder mass ratio of less than 10:1.

Microporous silicon structures have advantages over conventional silicon particles in lithium ion battery (LIB) anodes. The empty (void) space of the pores present in microporous silicon improves the electrode cycle life. This can be possible because the free space accommodates stresses created due to expansion and contraction occurring during lithiation/delithiation of the anode. The present disclosure provided processes of forming microporous silicon that show improved electrochemical properties and do not require harsh etchants such as fluorine containing etchants.

Provided are processes of forming microporous silicon suitable for use as an electrochemically active material, optionally in an anode, in electrochemical cells, as a supplement to an electrochemically active material, or as an electrochemically active material along with a second electrochemically active material. The processes provided combine a high energy milling process with a thermal reduction to produce solid silicon substantially by the overall reaction according to equation 1:

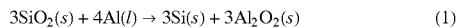

$$3SiO_2(s) + 4Al(l) \rightarrow 3Si(s) + 3Al_2O_2(s) \qquad (1)$$

A process includes subjecting a combination of silicon oxide, optionally powdered silicon oxide, and aluminum to mechanical milling to form a mechanically activated silicon oxide/aluminum, optionally $SiO_2/Al$, powder, thermally treating the silicon oxide/aluminum powder by exposure to heat at a temperature of 500 degrees Celsius to 1100 degrees Celsius, optionally 500 degrees Celsius to 700 degrees Celsius, under an inert or reducing atmosphere to form $Si/Al_2O_3$, and removing at least a portion of alumina from the $Si/Al_2O_3$ by exposing the $Si/Al_2O_3$ to an etchant to form microporous silicon optionally with average pore size ranging from 10-500 nm, optionally about 20 nm to 200 nm, optionally about 150 nm. The provided processes do not require the use of etchants that include harsh acids such as HF as etchants. As such, etching or other reaction with a fluorine containing etchant such as hydrogen fluoride (HF), buffered HF, $NH_4F$ or $HF/HNO_3$ mixtures are avoided.

Although the present disclosure is directed to aluminum as a reducing metal, other metals may be substituted therefore with other reducing metals illustratively including magnesium, calcium, aluminum silicide ($AlSi_2$), magnesium silicide ($Mg_2Si$), calcium silicide ($Ca_2Si$) or a combination thereof. In some aspects a metal reducing agent is aluminum exclusive of other reducing metals, a process optionally excluding magnesium, calcium, aluminum silicide ($AlSi_2$), magnesium silicide ($Mg_2Si$), calcium silicide ($Ca_2Si$) or a combination thereof.

An exemplary process is illustrated in the schematic of FIG. 1. At step 102, the starting materials are industrial grade (e.g. ≥98% pure or other industrial feedstock rather than solar or electronic grade as are recognized in the art) such as micron-size silicon oxide or silica, and micron-size aluminum metal (or other metal reducing agent) powders. The silicon containing material and aluminum average particle sizes are optionally about 20 and about 17 microns, respectively. However, larger particle size up to −325 mesh (~45 microns) can be used for both the oxide and the metal powders. Such powders are commercially available and commonly produced; illustratively from Alfa Aesar. The powders (e.g. SiO or $SiO_2$, and Al) are loaded into a reaction chamber at a desired mass ratio. A mass ratio is optionally a stoichiometric mass ratio based on equation (1). In some aspects a mass ratio includes excess reducing metal to obtain a completed or more completed reaction; optionally a mass ratio includes up to 40% extra reducing metal. A reaction chamber is optionally any container suitable for high energy milling, thermal treating, or other and optionally sealable from the external environment. An illustrative example of a reaction chamber is a stainless steel or ceramic jar. Included in the reaction chamber is milling media optionally formed of the same material as the reaction chamber. In some aspects, the milling media is or includes stainless steel or ceramic milling balls optionally ½ inch in diameter.

The components are subjected to a mechanical milling process such as ball milling, impact milling, attritor milling, and the like. The mechanical milling step provides mechanical activation and partial reduction of the silicon oxide precursor (combined described herein as "activation"). The mechanical activation of the material by milling facilitates the reduction reaction through both reducing the reactant diffusion distance and introducing defects and other forms of residual mechanical strain in the material. The temperature of chemical reduction of $SiO_2$ can be reduced to <800° C. when mechanical activation is employed, which otherwise requires T>1000° C. Mechanical milling provides a means to control the reaction kinetics of the reduction reactions. As a consequence, reactions that normally require high temperatures will occur at lower temperatures. In addition, the high defect densities induced by milling accelerate the diffusion process. In the example of FIG. 1 at 104, the powder mixture is milled using a high energy ball mill. This step produces the mechanical activation and partial displacement reduction reaction according to Equation 1. Repeated welding and fracturing of powder particles during the mechanical milling increases the area of contact between the reactant powder particles due to a reduction in particle size and allows fresh surfaces to come into contact repeatedly. The ball milling facilitates the reduction reaction through both reducing the reactant diffusion distance and introducing defects and other forms of residual mechanical strain. As a consequence, subsequent thermal treatment reactions that would otherwise require high temperatures will occur at lower temperatures during high energy milling without any externally applied heat. In addition, the high defect densities induced by milling accelerate the diffusion process. A high energy planetary ball mill (e.g. Retsch PM400) may be used to perform the mechanical milling reactions.

Mechanical milling is optionally achieved by ball milling, optionally high energy ball milling. A ball to powder (e.g. Si containing material and aluminum) mass ratio (BPR) may be 4:1 or greater, optionally 5:1, optionally 6:1, optionally 7:1, optionally 8:1, optionally 9:1, optionally 10:1, optionally 11:1, optionally 12:1, optionally 13:1, optionally 14:1, optionally 15:1, optionally 16:1, or greater. In some aspects, the BPR is 8:1 or greater. In some aspects, the BPR is 16:1 or greater. Optionally the BPR is from 4:1 to less than 16:1. Optionally the BPR is from 8:1 to less than 16:1. Varying the ball to powder ratio (at the same milling speed and time, and same reactant ratio) will affect the product obtained after thermal treatment. For example, when materials were thermally reduced at the same conditions (650° C. for 2 h, 2.5° C./min heating ramp under argon atmosphere), at 4:1 BPR for a milling reaction time of 4 h the main alumina phase is $\alpha$-$Al_2O_3$ with small amount of $\gamma$ phase and mullite ($[Al_{2.3}Si_{0.7}]O_{4.85}$). As the BPR increases to 8:1 (same other reaction conditions) $\gamma$-$Al_2O_3$ is the resulting he main alumina phase. By increasing BPR to 16:1 other less stable $Al_2O_3$ phases appear ($\eta$, $\beta$, $\delta$, etc.).

Mechanical milling is performed for a milling reaction time. A milling reaction time is any time suitable to activate the powders and at least partially reduce the silica. A milling reaction time is optionally from 0.2 hours to 20 hours, or any value or range therebetween, optionally 0.2 hours to 10 hours, optionally 0.2 hours to 5 hours, optionally 0.5 hours.

Milling is optionally performed under a non-reactive atmosphere such as an inert gas or a reducing atmosphere. Non-reactive atmospheres are known in the art, illustratively argon, xenon, or others. Adjustable mechanical milling parameters include rotational speed (or cycles/min), ball: powder mass ratio (BPR), ball size, silica:aluminum mass ratio. In some aspects, the mechanical milling may be performed at the following conditions, 1200 cycles/min, with 4:1 BPR, ½ inch diameter stainless steel balls and a stoichiometric 5:3 silica:aluminum mass ratio. The revolutions per minute or number of cycles per minute can vary between 200 and 1200; ball to powder ratios can fluctuate from 4:1 to 20:1; different media size from 5 to 15 mm can be used as well as other materials such as hardened steel, zirconia, etc. To ensure full reduction of silica, the aluminum quantity can be increased from the ideal (stoichiometric) value up to stoichiometric 40% excess, optionally up to stoichiometric 10% excess.

The mechanically activated $SiO_2$/Al powder is then thermally treated at step 106 in FIG. 1 in a tube (or other) furnace under an inert gas environment. Thermal reduction of silicon oxide by aluminothermic reaction initiates at temperatures below the aluminum melting point (660.9° C.). At temperatures as low as 500° C. reduction to silicon from silica and the formation of Si/$Al_2O_3$ begins to take place in the solid state. However, in the absence of mechanical milling the reduction reaction needs to reach temperatures >800° C. (to ~1100° C.) for the complete transformation of $SiO_2$/Al to Si/$Al_2O_3$. The step of mechanical milling significantly reduces this temperature requirement where complete conversion to Si/$Al_2O_3$ can be achieved at temperatures below 700° C. Thermal reduction is performed using a thermal treatment time for a reduction time.

A thermal treatment temperature is optionally from 500° C. to 1100° C., or any value or range therebetween. In some aspects, a thermal reduction temperature is 500° C. to 700° C., optionally 650° C. Optionally, a thermal reduction temperature is 500° C. to 650° C., optionally 525° C. to 700° C., optionally 525° C. to 650° C., optionally 500° C. to 600° C., optionally 600° C. to 700° C., optionally 600° C. to 650° C. In some aspects, a thermal reduction temperature does not exceed 700° C., optionally does not exceed 650° C., optionally does not exceed 600° C. XRD patterns show that the milled powder mixture should be heated up to at least 500° C. to initiate the $SiO_2$ reduction. And at ~550° C. all the Al will be consumed in the reaction in the production of Si/$Al_2O_3$. From 500° C. to less than 600° C. the main oxide phase is $\gamma$-$Al_2O_3$. As the temperature increases the $\gamma$-phase transforms to the more stable $\alpha$-$Al_2O_3$ phase.

The resulting alumina produced is optionally less than 50% alpha phase, optionally less than 25% alpha phase, optionally less than 10% alpha phase, optionally less than 5% alpha, optionally less than 1% alpha phase relative to the total alumina present A reduction time is optionally about 1 to about 4 hours, or any value or range therebetween. In some aspects, a reduction time is about 0.5 to about 2 hours, optionally about 2 hours. During a thermal reduction time a temperature increase is optionally a 2° C./min to 2.5° C./min heating rate. The thermal reduction products are elemental Si and aluminum oxide ($Al_2O_3$, also known as alumina). Adjustable thermal reduction parameters include heating rate, holding temperature and time. The heating rates are optionally kept between 0.5° C./min and 5° C./min and using the holding temperature and time ranges aforementioned.

The last step to synthesize μpSi is the removal of alumina by etching. Etching optionally excludes subjecting the material to contact with a harsh acid such as hydrogen fluoride or other fluorine containing etchant. The step of etching depicted in FIG. 1 at 108 optionally uses etchant(s) that do not result in the production of toxic waste. The etching process optionally will yield μpSi with the removal of alumina by dissolution. Illustrative etchants include particular acids, illustratively HCl, $H_2SO_4$, $H_3PO_4$, $HNO_3$, or combinations thereof. A concentration of etchant is optionally 0.5-12 M, optionally 0.5 to 4 M, optionally at or about 9 M, in the case of $H_2SO_4$, and similarly reactive concentrations for the use of other etchants. Etching is performed for an etching time, optionally from 1 to 6 hours. Etching is performed at an etching temperature. Etching temperature is optionally 25° C. to 250° C. or any value or range therebetween, optionally 80° C. or 250° C., optionally 80° C. to 140° C., optionally 180° C.

Aluminum oxide exists in a number of different phases ($\alpha$, $\beta$, $\gamma$, $\eta$, $\delta$, $\theta$, $\kappa$ and $\rho$). $\alpha$-$Al_2O_3$ is the most stable and least reactive phase. One advantage of the milling process is that the subsequent thermal reduction may be designed to limit formation of $\alpha$-$Al_2O_3$, and limit the need for more aggressive dissolution in the etching phase. Other phases such as $\gamma$-$Al_2O_3$ and $\theta$-$Al_2O_3$ can be dissolved in dilute hydrochloric acid (HCl) at relatively low temperatures.

Etching time and temperature are related to the degree of etching desired. Etching time is optionally from 1 to 3 hours, optionally 2 hours. As the etching proceeds the pores on the silicon particle grow increasing particle porosity and BET surface area. In addition, increased etching time decreases the amount of alumina remaining on the particles. It is believed that some residual $Al_2O_3$ may be tolerable or even beneficial in the final product as this phase is electrochemically inactive and may provide beneficial structural reinforcement of the μpSi particles. It is further believed that a modest decrease in capacity (mAh/g) due to the residual α-Al$_2$O$_3$ may be more than compensated by increased cycle life of the nanocomposite anode material. As such, the amount of residual alumina, optionally α-alumina, is optionally 15% or less, optionally 10% or less, optionally 5% or less, optionally 3% or less, optionally 2% or less with percentages being weight percent relative to the amount of alumina prior to etching. Residual alumina, optionally α-alumina, is optionally from 0.1% to 15%, optionally 0.1% to 10%, optionally 0.1% to 5%, optionally 0.1% to 3%, optionally 0.1% to 2% with percentages being weight percent relative to the amount of alumina prior to etching.

Following the etching process the resulting μpSi has a desired porosity. In some aspects, the porosity is 10% to 90% or any value or range therebetween, optionally 20% to 80%, optionally 30% to 60%, optionally at or about 50%.

The resulting μpSi is optionally tailored for a desired Brunauer-Emmett-Teller (BET) surface area. A BET surface area is optionally 10 m$^2$/g to 500 m$^2$/g or any value or range therebetween, optionally 20 m$^2$/g to 200 m$^2$/g, optionally 20 m$^2$/g to 100 m$^2$/g.

The resulting μpSi is optionally dried and sieved to a desired size. Drying may be performed in a standard drying oven used for electrode materials known in the art. Drying may be performed under an inert or air atmosphere at a temperature of 80° C. or other desired temperature.

The resulting particles are optionally sieved to a desired size. Illustrative particle sizes have an average diameter of 0.5 to 10 microns. A μpSi prior to combination with a carbon, a binder, or both may be in any physical form such as a particulate (e.g. powder), nanowire, sheet, nanotube, nanofiber, porous structure, whisker, nanoplatelet, or other configuration known in the art.

The μpSi has a porosity, optionally with an average pore size of at or about 10 nm to at or about 500 nm, optionally at or about 100 nm to at or about 200 nm, optionally at or about 150 nm.

The μpSi is optionally used as an active material alone or in combination with one or more other active materials in the formation of an electrode for use in a primary or secondary battery. The μpSi is optionally combined with a second active material, optionally carbon or graphitized carbon. Carbon and graphitic carbon materials such as natural graphite, graphene, artificial graphite, expanded graphite, carbon fibers, hard carbon, carbon black, carbon nanotubes, fullerenes, and activated carbon may be used. In some aspects, μpSi powders are combined with graphite. Low energy ball milling may be used to create a graphite shell around silicon particles. In order to guarantee good electrode coating and cell performance, the μpSi/Graphite composite may have the following properties: 5-10 μm particle size, a BET surface area of less than 20 m$^2$/g, and an anode tap density of 0-8-1.2 g/cm$^3$. These properties will allow fabrication of coatings with electrode loadings of greater than 3 mAh/cm$^2$.

A μpSi active material may or may not be associated with an electrically conductive substrate. When associated with a substrate, the substrate is optionally formed of any suitable electronically conductive and impermeable or substantially impermeable material, including, but not limited to, copper, stainless steel, titanium, or carbon papers/films, a non-perforated metal foil, aluminum foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some aspects, substrates may be formed of one or more suitable metals or combination of metals (e.g., alloys, solid solutions, plated metals). Optionally, a μpSi active material is not associated with a substrate.

A μpSi active material may be associated with a binder. A binder material is optionally used at 1-10% by weight of solvent and combined with the μpSi active material. A binder material optionally includes common Si anode binder such as carboxymethyl cellulose (CMC) or styrene-butadiene rubber (SBR) binders. In some aspects PVdF binder solutions in NMP or aqueous polyolefin latex suspensions may be used. Examples of the solvent used in preparation of the electrode may include, but are not limited to aqueous, carbonate-based, ester-based, ether-based, ketone-based, alcohol-based, or aprotic solvents. Specific solvents such as dimethyl sulfoxide (DMSO), N-methyl pyrrolidone (NMP) and ethylene glycol, and distilled water may be used. Such solvents are known in the art. The resulting slurry may be applied to the substrate followed by standard techniques including casting, drying, and optionally pressing. The substrate is optionally electrically associated with an electrode tab in order to electrically connect the electrode to the appropriate terminal of a battery (i.e., negative electrode to negative terminal and positive electrode to positive terminal). The electrode tab may be welded by a method of welding that includes, but is not limited to, resistance welding, laser welding, electron beam welding, or ultrasonic welding.

An electrochemical cell typically includes a separator positioned between the electrodes. A separator is optionally a non-woven, felted, nylon, or polypropylene material that is permeable to hydroxide ions and may be suitably saturated with electrolyte.

An electrochemically active material including the μpSi as provided herein alone or in combination with another active, optionally a carbon active, shows improved cycle life and similar initial capacity loss (ICL) relative to other silicon electrochemically active materials. A μpSi optionally has a cycle life of greater than 80% residual capacity at cycle 40, cycle 45, cycle 50, cycle 55, cycle 60, cycle 65, cycle 70, cycle 75, cycle 80, cycle 85, cycle 90, cycle 95, or greater. Prior materials measured under the same conditions show significantly lower cycle life as defined as the cycle which the capacity drops below 80% residual capacity.

An important characteristic of the μpSi materials as provided herein is that the ICL is nearly equivalent to other materials such as other porous silicon materials, but shows significantly improved cycle life. As such, the ICL of a μpSi as provided herein is optionally from 15% to 25%, optionally from 19% to 21%, optionally less than 20%.

An anode, cathode, electrolyte, and separator may be housed in a casing as is typically known in the art to form an enclosed or substantially enclosed electrochemical cell.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Figure 2A:
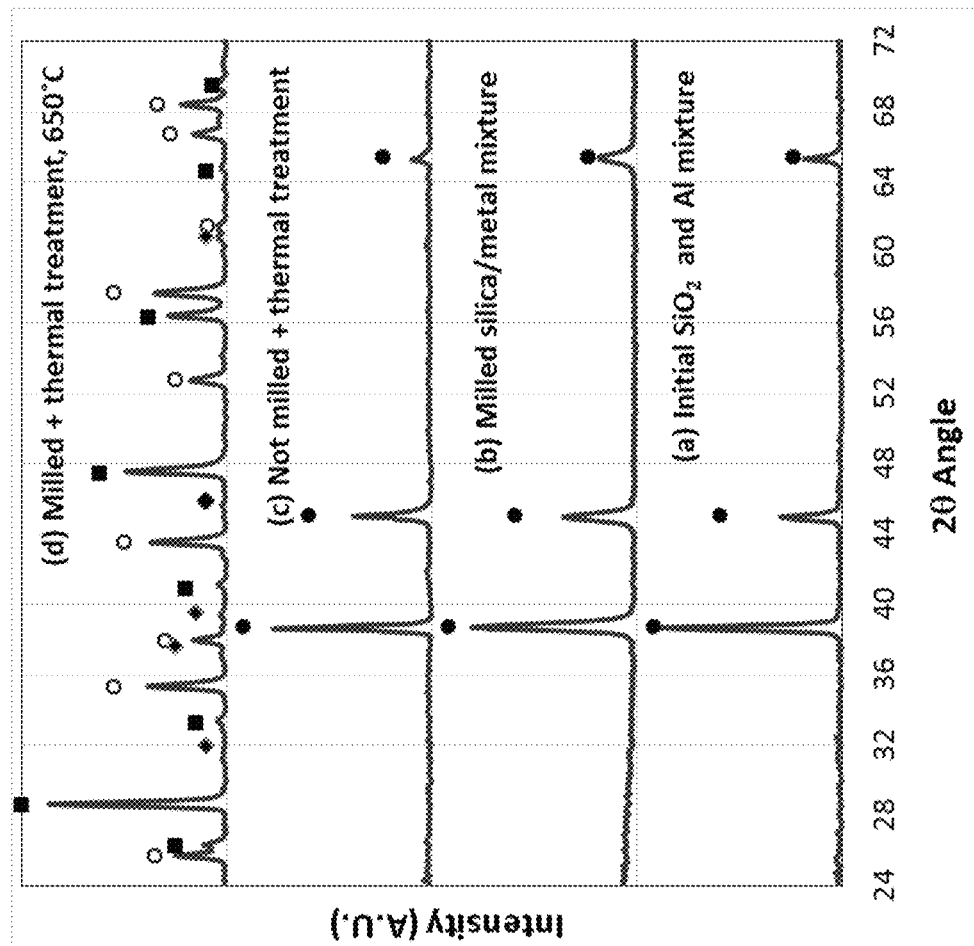
FIG. 2A demonstrates X-ray diffraction patterns of milled and or thermally treated material according to some aspects with: trace (a) the initial $SiO_2$ and Al mixture (premix at 2000 rpm with centrifugal mixer); trace (b) after mechanical milling activation (BPR 4: for 4 h); trace (c) unmilled powder (only premixed) after thermal treatment at 650° C. for 2 h (2.5° C./min heating ramp under argon atmosphere); and trace (d) mechanically milled material after final thermal reduction at 650° C. for 2 h (2.5° C./min heating ramp under argon atmosphere), (●) aluminum, (■) silicon, (○) α-alumina, (♦)γ-alumina, and (□) mullite ($[Al_{2.3}Si_{0.7}]O_{4.85}$)

Inexpensive commercially available micron size silica (SiO$_2$) powder (Grace Davison PERKASIL Silica, 15-20 μm, BET Surface areas 190 m$^2$/g, 98% SiO$_2$ dry basis) (Other silica used, U.S. Silica MIN-USIL, 5-45 micron particle size, 99.4% SiO$_2$) was pre-mixed (FlackTek Speed mixer, 2000 rpm for 2 mins three times and stirred with a spatula) with aluminum powder (mesh 325, 99.97% Al, Alfa Aesar) and transferred to a hardened steel jar along with milling media of the same composition. The jar was filled with argon and sealed before mechanical milling. High-energy ball milling (stoichiometric mass ratio of reactants, 4:1 ball to powder ratio, milled for 4 h hours using SPEX 8000, 1200-1500 cycles per minute) activated the powder systems and partially reduced the silica as milling proceeded (t>0.5 h). After mechanical milling, the powder mixture was transferred to a tube furnace to proceed with the thermal reduction. Thermal reduction was performed over a range of temperatures from 500° C. to 700° C. under argon atmosphere. XRD patterns taken at different stages of the reduction process are shown in FIG. 2A. The initial powder mixture shows strong aluminum XRD peaks and almost unnoticeable silica broad peaks. After 0.5-4 h time periods of high energy ball milling small peaks of alumina start to appear on the pattern. Thermal treatment at 650° C. for 2 hours (with a 2.5° C./min heating rate) led to the complete conversion $SiO_2$/Al to Si/$Al_2O_3$ as shown in the pattern (top line) in FIG. 2A.

Figure 2B:
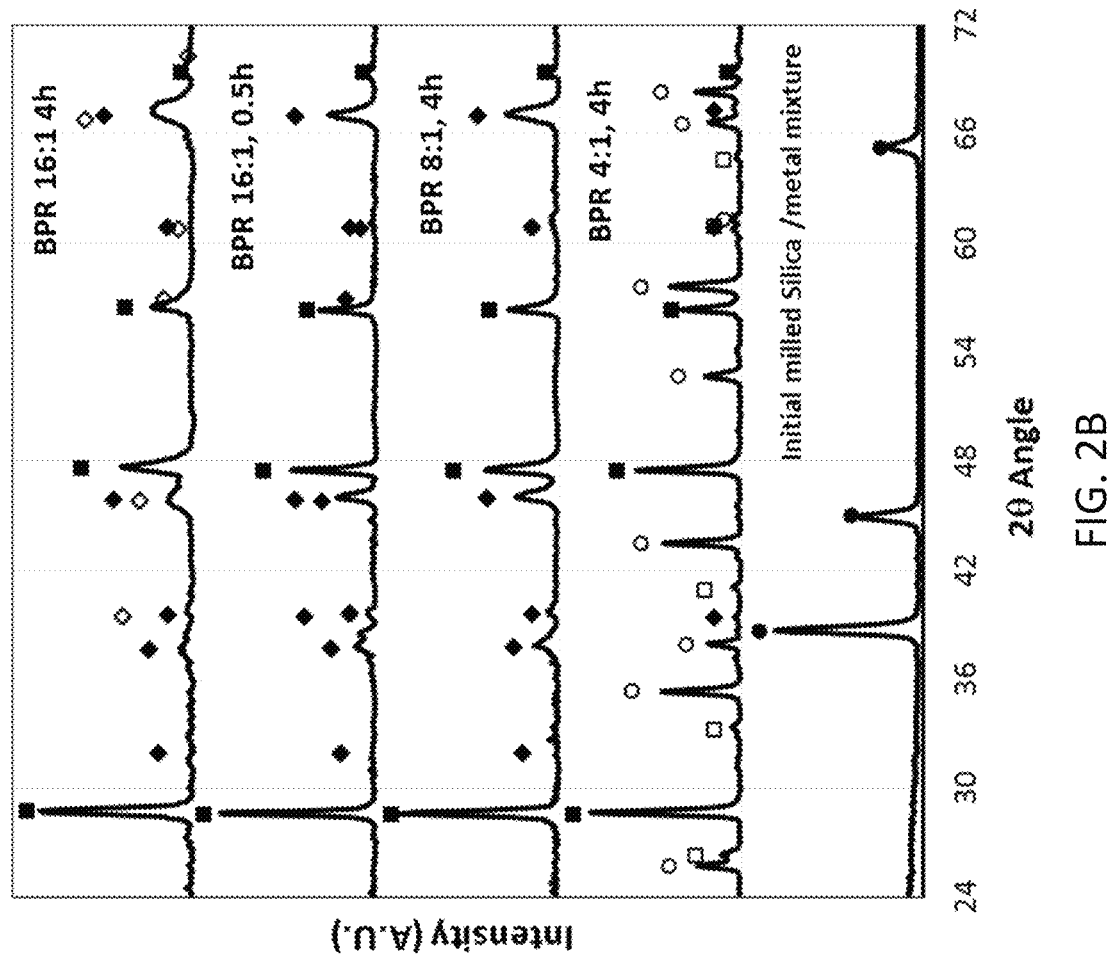
FIG. 2B illustrates XRD patterns for powder mixtures mechanically milled at different conditions and thermally treated at the same temperature (●) Al metal, (■) silicon, (♦) γ-$Al_2O_3$ (◇) η-$Al_2O_3$(○)α-$Al_2O_3$ (□) mullite ($[Al_{2.3}Si_{0.7}]O_{4.85}$)

Process parameters such as BPR affect the resulting type of alumina formed in the process. Samples prepared as above (pre-mixed using a FlackTek Speed mixer, 2000 rpm 2 mins three times and stir with spatula, stoichiometric reactants mass ratio) and thermally reduced at the same conditions (650° C. for 2 h, 2.5° C./min heating ramp under argon atmosphere), but milled at various BPR ratios for 4 hours (using SPEX 8000, 1200-1500 cycles per minute) demonstrate differing phases of alumina as illustrated in FIG. 2B. At 4:1 BPR for 4 h majority of $Al_2O_3$ is in the alpha (α) phase, with small amounts of gamma (γ) and Mullite ($[Al_{2.3}Si_{0.7}]O_{4.85}$) present. As the BPR increases to 8:1 (same milling time, etc.) γ-$Al_2O_3$ becomes the most prominent phase. Increasing BPR to 16:1 produces other less stable $Al_2O_3$ phases (η, β, δ, etc.).

Figure 2C:
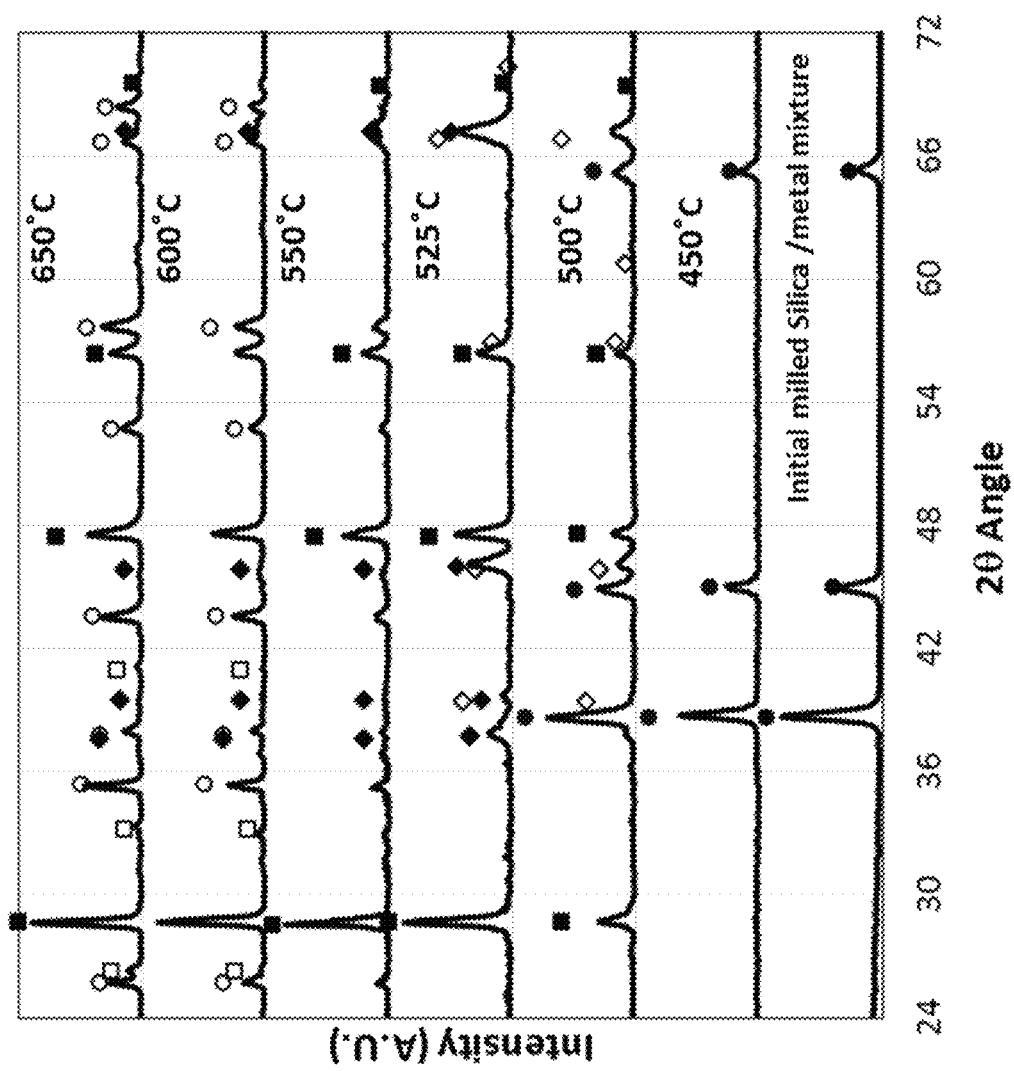
FIG. 2C illustrates XRD patterns for powders thermally treated at different temperatures and where mechanical milling conditions (e.g. BPR, etc.) were kept constant for all samples (●) Al metal, (■) silicon, (♦)γ-$Al_2O_3$ (◇) η-$Al_2O_3$ (○)α-$Al_2O_3$ (□) Mullite ($[Al_{2.3}Si_{0.7}]O_{4.85}$)

Thermal treatment temperatures also play a role in the type of alumina produced by the processes. FIG. 2C illustrates XRD patterns for milled powder samples treated at different thermal reduction temperatures (450° C., 500° C., 525° C., 550° C., 600° C. and 650° C.). All samples were ball milled at BPR 4:1 for 2 h (at the same milling speed and time, and same stoichiometric reactant ratio). The holding time was 2 h with a 2.5° C./min heating ramp under argon atmosphere. Si (reduced) peak starts to appear at ~500° C. and it is fully reduced at T≥525° C. From 500° C. to less than 600° C. the main oxide phase is the γ-$Al_2O_3$ phase. As the temperature increases the γ-phase transforms to the more stable α-$Al_2O_3$ is the main phase.

Figure 3B:
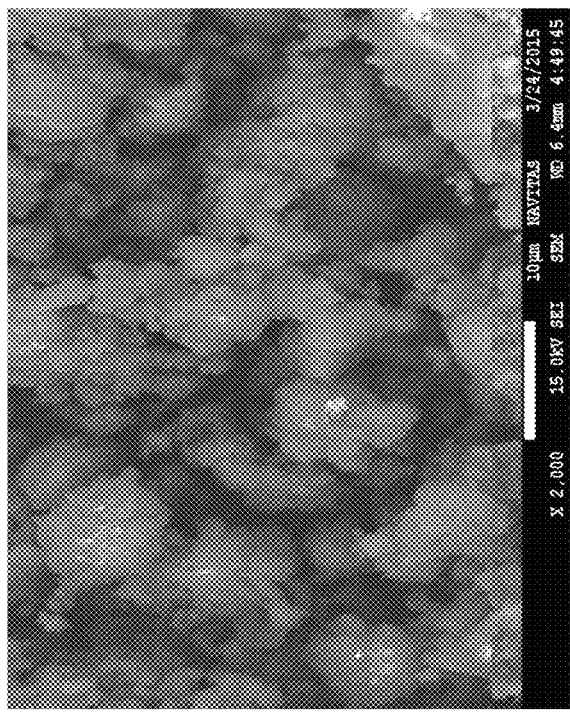
FIG. 3B illustrates a SEM micrograph of a microporous silicon fabricated by the two-step reduction process and after 4-hour $H_2SO_4$ etching (no HF or metal catalyst)
Figure 3A:
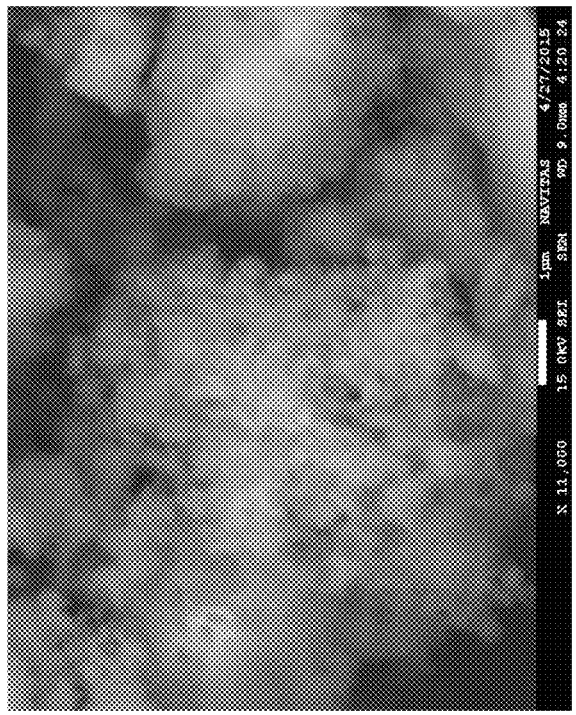
FIG. 3A illustrates a SEM micrograph of a $SiO_2$ and Al mixture after ball milling.
Figure 4:
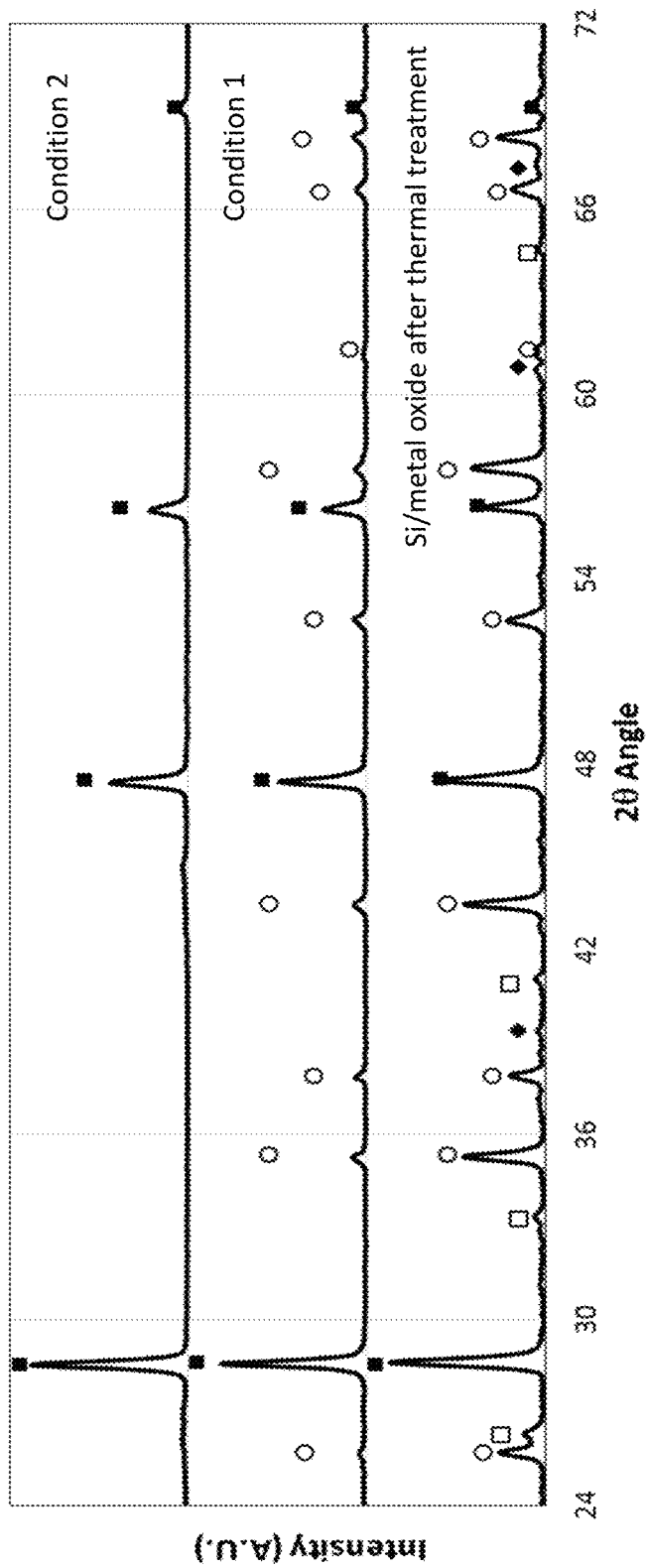
FIG. 4 illustrates XRD patterns for samples after thermal treatment and exposure to an etchant under differing conditions illustrating residual oxides of less than 3% (●) Al metal, (■) silicon, (○)α-$Al_2O_3$ (□) mullite ($[Al_{2.3}Si_{0.7}]O_{4.85}$)

The final Si/$Al_2O_3$ powder mixtures were then treated with an etchant optionally including an acid (e.g. HCl, $H_2SO_4$). By avoiding the use of HF or other harsh etchants, less costly reaction vessels and other safety precautions (e.g. hood use) are less demanding due to the increased safety associated with the presently provided processes. The etching process was carried out at 180° C. for 4 h under continuous stirring; this process removed most of the alumina (EDS spectra shows ~5 wt % elemental Al left) leaving Si particles with a porous structure. FIG. 3 shows SEM micrographs of the as thermal treated powder (A) and the porous structure after 4 h of etchant digestion (B, 60 wt % sulfuric acid). XRD data (FIG. 4) indicate the main component of the thermally treated powder is elemental Si with small traces of alumina (broad short peaks at 24-26 and 43-45 diffraction angles). FIG. 4 shows diffraction patterns for two acid etching conditions, condition 1 was done with 70% $H_2SO_4$ for 1 h, and condition 2 was done with 70% $H_2SO_4$ for 4 h. The physical properties of the microporous silicon are illustrated in Table 1.

TABLE 1

| Property | Commercial Si | mPSi with (>97% Si) |
|---|---|---|
| Total Pore Area ($m^2$/g) | 8.6 | 11.5 |
| Average Pore Diameter (nm) | 310 | 150 |
| Bulk Density (g/mL) | 0.81 | 0.84 |
| Skeletal density (g/mL) | 1.78 | 1.34 |
| BET surface area ($m^2$/g) | 4.3 | 36.2 |

Electrochemical properties of μpSi and the influence of the porous structure on LiB anode performance were evaluated in half coin cells. Electrodes were coated using a combination of μpSi and commercial graphite (Nippon Carbon Co. natural graphite, AZBD series, tap density 1.01 g/$cm^3$, BET surface area 2.71 $m^2$/g, $D_{50}$ particle size 14.2 microns). Commercial micron size Si (silicon powder, 1-5 micron, 99.9%, Alfa Aesar) before and after HF etching (HF etched μpSi, 6M HF etched for 8 h) were used for comparison. To form the μpSi containing electrodes, graphite and porous silicon were mechanically (100-1200 rpm, Retsch PM 400 planetary ball mill) mixed in a 1:1 mass ratio. Both μpSi/graphite and graphite electrodes were hand casted 10 μm copper foil using water based binders at a mass ratio of 92/1.5/6.5 for silicon/graphite/binder material respectively. The materials were tested in CR2025 half cells. The half-cell formation was carried out at C/20 current rate from 10 mV to 1.5V. Rate capability and cycle life were performed with an operation voltage of 0.01-0.7V. For rate studies cells were lithiated at C/10 and delithiated at 0.1, 0.2, 0.5, 1.0, 2.0 and 5.0 C. Cycling experiments were run at 0.5 C.

Table 2 summarizes first formation cycle values for tested cells, the electrochemical loading was ~2 mg/$cm^2$. Initial lithiation capacity is lower for the μpSi anode formed using the material made by the two-step activation process as follows. The μpSi was made by ball milling 15-20 micron silica (Grace Davison) and mesh 325 Al (Alfa Aesar) at 4:1 BPR for 4 hour using a stoichiometric reactant mass ratio; the milled powder was thermally treated at 600° C. under Ar, for 2 h using a 2° C./min heating rate; thermally treated precuts were etched using 40% $H_2SO_4$ for 4 h. A graphite shell was added to the μpSi particle by ball milling graphite (Nippon Carbon Co. natural graphite, AZBD series, tap density 1.01 g/$cm^3$, BET surface area 2.71 $m^2$/g, $D_{50}$ particle size 14.2 microns) with μpSi at low energy (100-1200 rpm for 4 h, Retsch PM 400 planetary ball mill). The difference in capacity is believed to be due to the 5% metal oxide (calculated using EDS and XRD data) content in the active material.

TABLE 2

| Anode | Active Material | 1st Cycle Specific Capacity (mAh/mg) | | ICL (%) |
|---|---|---|---|---|
| | | Lithiation | Delithiation | |
| Si-Graphite composite | Commercial μsize Si | 1781 | 1441 | 19 |
| | HF etched μpSi | 1795 | 1436 | 20 |
| | μpSi | 1671 | 1357 | 19 |

Figure 5B:
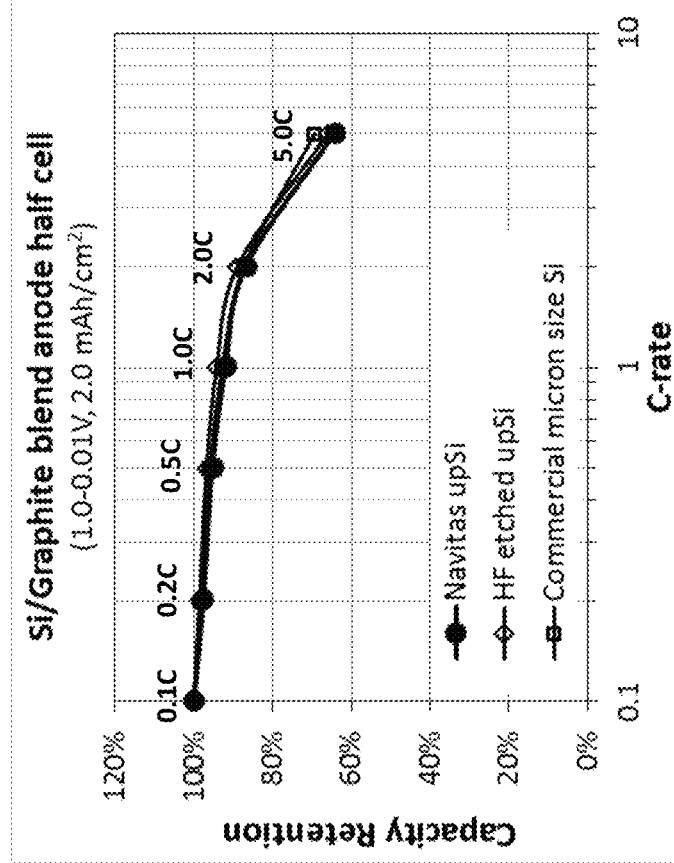
FIG. 5B illustrates rate capabilities of anodes based on commercial 1-5 μm non-porous Si (□), conventional HF etched porous Si (◇), and the μpSi (●) and natural graphite (1:1 mass ratio)
Figure 5A:
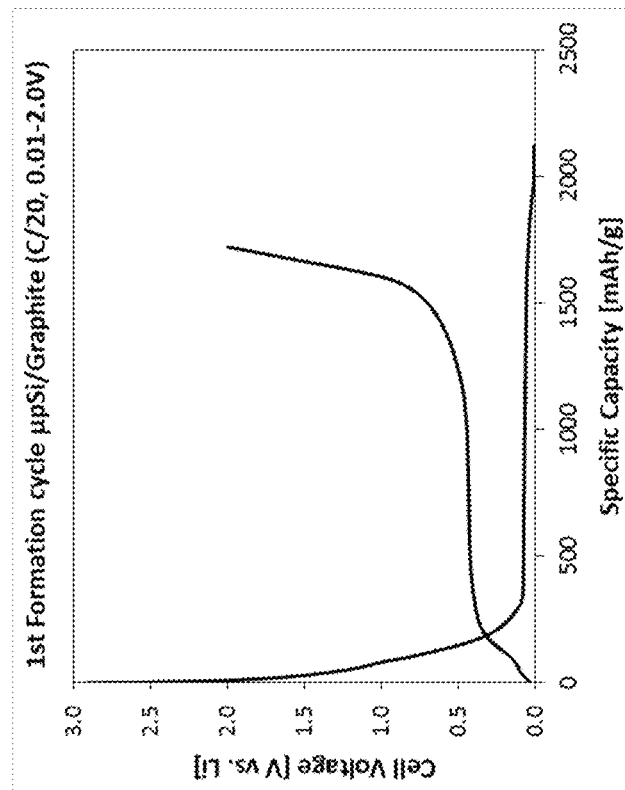
FIG. 5A illustrates the formation cycle of half-cell anode electrodes hand casted with μpSi and graphite (1:1 mass ratio) at a C/20 rate from 0.01V to 2.0V, with ~21% ICL and reversible capacity was 1600 mAh/g.

FIG. 5A shows the first formation cycle (at C/20 rate) for the μpSi/graphite composite half-cell anode illustrating the reversible capacity ~1600 mAh/g. Rate performance and cycle life experiments were also performed.

Rate capability was tested using cells lithiated at C/10 and delithiated at 0.1 C, 0.2 C, 0.5 C, 1.0 C, 2.0 C and 5.0 C. Tests show good behavior of μpSi/graphite comparable to the pure graphite electrodes as illustrated in FIG. 5B.

Figure 5C:
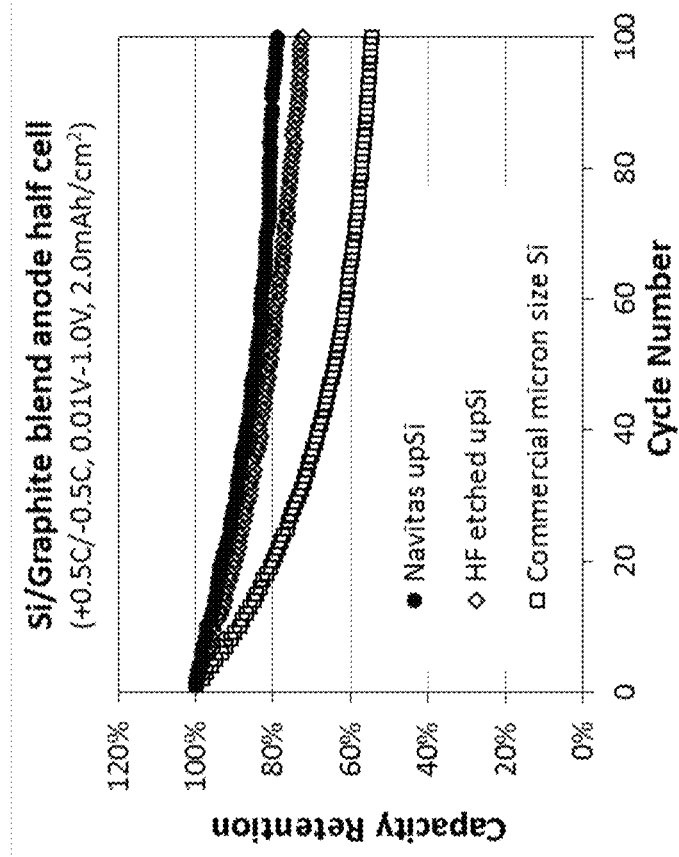
FIG. 5C illustrates cycle life comparison of various materials where cycling performance for electrodes fabricated with commercial 1-5 μm non-porous Si (□), conventional HF etched porous Si (◇), and the μpSi (●) mixed with natural graphite (1:1 mass ratio)

In addition, cycle life testing results show a clear advantage when using μpSi which has a much improved cycle life over the non-porous micron sized Si. The processed μpSi/metal oxide using the procedures described above to produce μpSi also shows a noticeably higher capacity retention than HF-etched porous Si, which suggests a combined benefit of the porous structure and the stabilization effect of metal oxide shown in FIG. 5C. Without being limited to one particular theory, the empty (void) space of the μpSi pores is believed to improve the electrode cycle life. This free space is believed to accommodate stresses created due to expansion and contraction occurring during lithiation/delithiation of the anode.

Safety and abuse tolerance of the Si composite anodes were performed by differential scanning calorimetry (DSC). DSC enables the thermal response of individual and selected combinations of cell components to be measured over a broad temperature range. DSC allows qualitative measurements of the local charge state of the electrodes, which impacts the cell thermal reactivity leading to cell thermal runaway as well as cell self-discharge.

DSC measurements were made for porous Si (HF etched Si) and μpSi (made by the processes as follows) with composites with different contents of alumina. The μpSi was made by ball milling 15-20 micron silica (Grace Davison) and mesh 325 Al (Alfa Aesar) at 4:1 BPR for 4 hour using a stoichiometric reactant mass ratio; the milled powder was thermally treated at 600° C. under Ar, for 2 h using a 2° C./min heating rate; thermally treated precuts were etched using 40% $H_2SO_4$ for 4 h. The different porous materials were mixed with natural graphite at a 1:1 weight ratio by ball milling graphite (Nippon Carbon Co. natural graphite, AZBD series, tap density 1.01 $g/cm^3$, BET surface area 2.71 $m^2/g$, $D_{50}$ particle size 14.2 microns) with the μpSi at low energy (100-1200 rpm for 4 h, Retsch PM 400 planetary ball mill). Safety studies were performed on fully lithiated (100% SOC) electrodes. Measurements were made on disassembled cells as well as laboratory half-cells enabling detailed characterization of individual electrode changes under controlled conditions. After formation, the cells were taken to full charge and disassembled inside an argon-filled glovebox, the anodes were harvested and transferred and hermetically sealed in DSC pans. The sealed pan was transferred to a TA DSC Q200 instrument for DSC analysis. DSC measurements were performed under $N_2$ at 30° C.-400° C. with a heating rate of 5° C./min.

Figure 6:
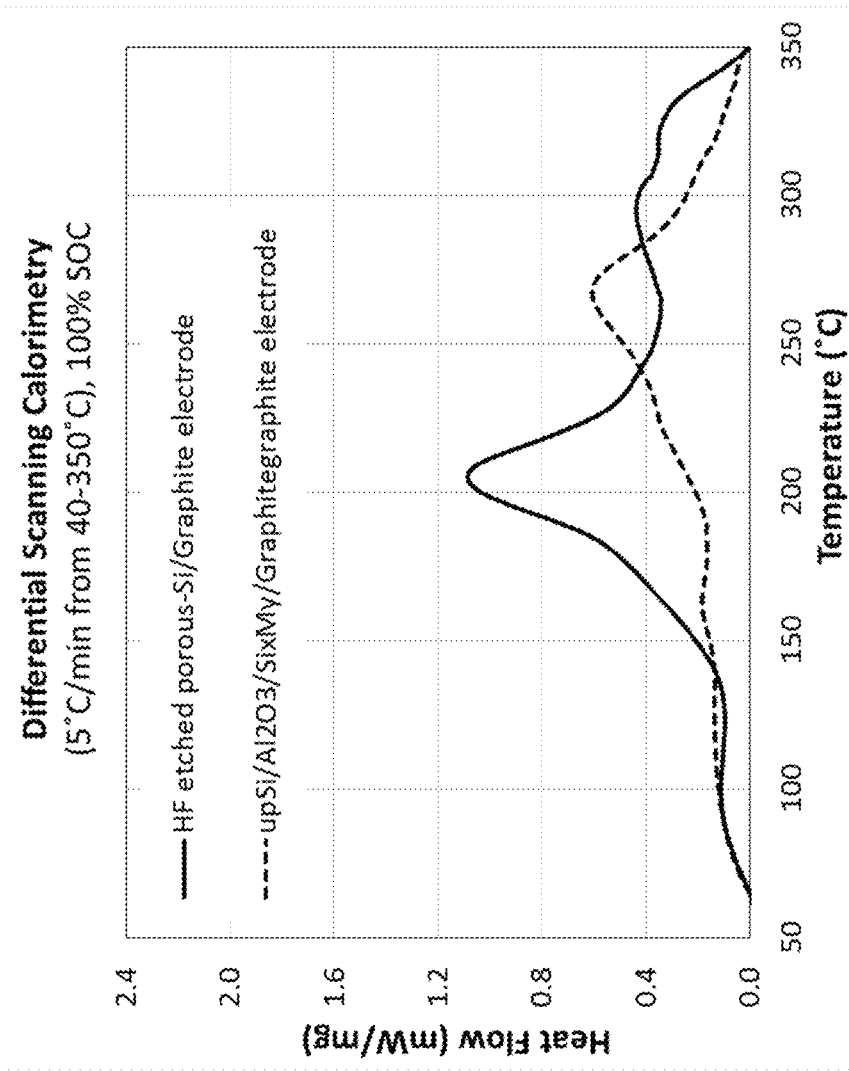
FIG. 6 illustrates differential scanning calorimetry plots for a (■) porous Si/graphite electrode and (---) μpSi/Graphite composite each fully lithiated (100% SOC).

DSC curves for two anode materials are shown FIG. 6. The anodes compared were HF etched porous Si/graphite (baseline) and μpSi/graphite formed as above. The HF etched porous Si was made using 1-5 micron Si powder (99.9%, Alfa Aesar) and 6M HF solution, the reaction was held for 8 h. The μpSi/made by ball milling 15-20 micron Silica (Grace Davison) and mesh 325 Al (Alfa Aesar) at 4:1 BPR for 4 hour using a stoichiometric reactant mass ratio; the milled powder was thermally treated at 600° C. under Ar, for 2 h using a 2° C./min heating rate; thermally treated precuts were etched using 40% $H_2SO_4$ for 4 h. The addition of graphite to make porous Si/graphite and μpSi/graphite was done by ball milling graphite (Nippon Carbon Co. natural graphite, AZBD series, tap density 1.01 $g/cm^3$, BET surface area 2.71 $m^2/g$, $D_{50}$ particle size 14.2 microns) with porous Si or μpSi/$Al_2O_3$; at low energy (100-1200 rpm for 4 h, Retsch PM 400 planetary ball mill). Both anodes showed exotherms commonly attributed to reaction of the solid electrolyte interface (SEI) layer starting around 120° C. but the baseline anode clearly liberated more heat and at lower temperatures. Additionally, the experiments on graphite anodes at the same conditions run by Sandia National Lab [Doughty 2012], showed >2× higher heat release than the Si/graphite (baseline). These results confirm that the improved electrochemical and thermal properties are attributable to the novel architecture of our proposed anode material.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

REFERENCE LIST

Zhang, P., et al. U.S. Pat. No. 7,722,991 B2 May 25, 2010
Richard, M., et al., U.S. Pat. No. 8,039,152 B2 Oct. 18, 2011
Zhang, P., et al., U.S. Pat. No. 8,679,679 B2 Mar. 25, 2014
Mao, O. et al., Electrochem. Solid-State Lett. 1999, 2, 3-5.
Obrovac, M., et al., J. Electrochem. Soc. 2007, 154, 9, A849-A855.
http://www2.lbl.gov/dir/assets/docs/TRL%20guide.pdf
Standage, A., et al., J Am. Ceram. Soc. 1967, 50(2), 101-105.
Dequing W., et al., J. Mater. Synthesis and Process. 2012, 9, 5-9
Grigoryeva, T., et al., J. of Physics: Conference Series 2009, 144, 021080.
Zheng, Y. et al., Electrochim. Acta 2007, 52, 5863-5867.
Matteazzi, P., et al., Amer. Ceram. Soc. 1992, 75, 2749-55.
He, Y., et al., Adv. Mater. 2011, 23, 4938-4941.
Hwang, G., et al., Chem. Commun. 2015, 51, 4429-4432.
Wang, J., et al., J. Mater. Chem. A. 2014, 2, 2306-2312.
Nguyen, H., et al., J. Mater. Chem., 2012, 22, 24618-24626.
Kim, S., et al., J. Mater. Chem. A, 2015, 3, 2399-2406.
Gallagher, K., Ener. Environmental Sci. 2014, 7 (5), 1555-1563.
Manufacturing Readiness Level (MRL) Deskbok, DOD, ODS Manufacturing Technology Program, Version 2.0,
Suryanarayana, C. Progress in Materials Science, 2001, 46, 1-184.
Prabriputaloong, K. and Piggott, M., J. Electrochem. Soc.: Solid-State Sci. Tech. 1974, 121, 3.
http://www.chemguide.co.uk/inorganic/period3/oxidesh2o.html, Apr. 5, 2015

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The invention claimed is:

1. A process for the formation of microporous silicon comprising:
   subjecting a combination of powdered silicon oxide and aluminum to mechanical milling to form a mechanically activated silicon oxide/aluminum;

thermally treating said silicon oxide/aluminum by exposure to heat at a temperature of 500 degrees Celsius to 650 degrees Celsius for 4 hours or less under an inert or reducing atmosphere to form $Si/Al_2O_3$ such that said $Si/Al_2O_3$ comprises alumina with a predominant $\gamma$-$Al_2O_3$ phase; and removing at least a portion of alumina from said $Si/Al_2O_3$ by exposing said $Si/Al_2O_3$ to an etchant to form microporous silicon;

wherein said microporous silicon further comprises 15% or less by weight alumina.

2. The process of claim 1, wherein said silicon oxide has a linear dimension of 500 micrometers or less.

3. The process of claim 1, wherein said heat is at a temperature of 500 degrees Celsius to 600 degrees Celsius.

4. The process of claim 1, wherein said step of subjecting is by ball milling at a ball to powder mass ratio of 4:1 to 16:1.

5. The process of claim 1, wherein said etchant excludes fluorine.

6. The process of claim 1, wherein said etchant excludes hydrogen fluoride.

7. The process of claim 1, wherein 85 alumina weight percent to 100 alumina weight percent of said alumina is removed by said step of removing.

8. The process of any claim 1, wherein 85 alumina weight percent to 99 alumina weight percent alumina is removed by said step of removing.

9. The process of claim 1, wherein said acid comprises HCl, $H_2SO_4$, $H_3PO_4$, $HNO_3$ or combinations thereof.

10. The process of claim 1, wherein said step of subjecting is in a high energy ball mill.

11. The process of claim 1, wherein said step of subjecting is for a milling time of 0.5 to 24 hours.

* * * * *